United States Patent
Sasaoka et al.

(10) Patent No.: US 6,618,532 B1
(45) Date of Patent: Sep. 9, 2003

(54) OPTICAL TRANSMISSION LINE

(75) Inventors: Eisuke Sasaoka, Yokohama (JP);
Shigeru Tanaka, Yokohama (JP);
Masayuki Nishimura, Yokohama (JP);
Shinji Ishikawa, Yokohama (JP);
Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/628,510

(22) Filed: Nov. 27, 2000

(30) Foreign Application Priority Data

Sep. 17, 1999 (JP) .......................................... 11-264080

(51) Int. Cl.$^7$ ................................................. G02B 6/02
(52) U.S. Cl. ..................................................... 385/123
(58) Field of Search ................................ 385/122–126, 385/28, 147

(56) References Cited

U.S. PATENT DOCUMENTS 5,854,871 A  * 12/1998  Akasaka ...................... 385/123
5,894,537 A    4/1999  Berkey et al.

FOREIGN PATENT DOCUMENTS

EP          0 724 171        7/1996
WO          WO 99/42869      8/1999

OTHER PUBLICATIONS

"Dispersion Flattened Single–Mode Fiber for 10,000km Transmission System", Y. Kubo et al., 16th European Conference on Optical Communication, Sep. 16–20, 1990.

* cited by examiner

*Primary Examiner*—Khiem Nguyen
(74) *Attorney, Agent, or Firm*—McDermott, Will & Emery (57) ABSTRACT

An optical transmission line having reduced flunctions in transmission quality is formed with a structure in which first and second waveguides whose transmission characteristics at a predetermined wavelength in a wavelength band in use are set opposite to each other and are arranged alternately. The chromatic dispersion of the first and second waveguides are set so as to have signs opposite to each other, and the dispersion slope of the first and second waveguides are set so as to have signs opposite to each other. Embodiments include setting the absolute value of chromatic dispersion in each first waveguide to 1 ps/nm/km or more but 10 ps/nm/km or less, and the absolute value of chromatic dispersion in each second waveguide is set to 1 ps/nm/km or more but 10 ps/nm/km or less.

36 Claims, 6 Drawing Sheets

OPTICAL TRANSMISSION LINE

BACKGROUND OF THE INVENTION

1. Field of the Invention

The present invention relates to an optical transmission line through which a plurality of wavelengths of optical signals propagate in a transmission system utilizing a wavelength division multiplexing (WDM) technique.

2. Related Background Art

WDM transmission systems enable high-speed, large-capacity optical communications by transmitting a plurality of wavelengths of optical signals (WDM signals). Silica type optical fibers utilized as optical transmission lines in such WDM transmission systems have been known to lower their transmission loss near a wavelength of 1.55 μm (1550 nm). Also, since optical amplifiers amplifying optical signals in a wavelength band of 1.55 μm have been in actual use, optical signals in the 1.55-μm wavelength band are used in general.

In optical transmission lines, if chromatic dispersion occurs in a wavelength band in use (e.g., 1.55-μm wavelength band), then signal waveforms are deformed, whereby transmission characteristics may deteriorate. Therefore, from the view point of preventing signal waveforms from being deformed, it is desirable that the absolute value of chromatic dispersion in the wavelength band in use be smaller. If the absolute value of chromatic dispersion in the wavelength band in use is not greater than a predetermined value, on the other hand, then four-wave mixing, which is a kind of nonlinear optical phenomena, is likely to occur. The occurrence of four-wave mixing generates cross talk and noise, thereby eventually deteriorating transmission characteristics. For suppressing the occurrence of four-wave mixing, the repeater intervals for arranging optical amplifiers may be shortened, and the optical power of optical signals emitted from the optical amplifiers may be lowered. However, for realizing this, it is necessary to install a large number of optical amplifiers, which lowers the cost performance of the whole system.

For dealing with problems such as those mentioned above, U.S. Pat. No. 5,894,537 discloses an optical transmission line in which respective sections having positive and negative chromatic dispersions at a predetermined wavelength in the wavelength band in use are alternately disposed along its longitudinal direction. When such an optical transmission line is used, transmission characteristics can be restrained from deteriorating due to chromatic dispersion if the average chromatic dispersion observed as the whole system is set such that its absolute value does not exceed a predetermined value. It has also been presumed that the deterioration of transmission characteristics caused by nonlinear optical phenomena such as four-wave mixing can be suppressed if the absolute value of chromatic dispersion is set to a predetermined value or higher in most of the sections of the optical transmission line.

Also, a reference—Y. Kubo, et al., "Dispersion Flattened Single-Mode Fiber for 10,000 km Transmission System, "ECOC'90 (1990)—which will herein after be referred to as Kubo reference, describes an optical transmission line including respective sections in which both chromatic dispersion and dispersion slope at a predetermined wavelength in the wavelength band in use are positive and negative. When such an optical transmission line is employed, the average chromatic dispersion observed as the whole system can be set such that its absolute value does not exceed a predetermined value in a wide wavelength band. As a result, the deterioration in transmission characteristics caused by chromatic dispersion is suppressed over this wide wavelength band.

SUMMARY OF THE INVENTION

The inventors have studied the above-mentioned conventional techniques and, as a result, have found problems as follows. The optical transmission line disclosed in the above-mentioned U.S. Pat. No. 5,894,537 can set the average chromatic dispersion observed as the whole system, such that its absolute value does not exceed a predetermined value at a predetermined wavelength in a wavelength band in use. At other wavelengths in the wavelength band in use, which are different from the above-mentioned predetermined wavelength, however, the absolute value of average chromatic dispersion observed as the whole system becomes greater, thereby yielding a possibility that the deterioration of transmission characteristics caused by chromatic dispersion cannot effectively be suppressed over the whole wavelength band in use. In particular, as the difference between the above-mentioned predetermined wavelength and other wavelengths included in the wavelength band in use is greater, the absolute value of average chromatic dispersion observed as the whole system becomes greater. Therefore, even when the optical transmission line disclosed in the above-mentioned U.S. Pat. No. 5,894,537 is utilized, there is a possibility that a WDM transmission system having a wide wavelength band in use is hard to realize.

The optical transmission line disclosed in the above-mentioned Kubo reference can set the average chromatic dispersion observed as the whole system, such that its absolute value does not exceed a predetermined value in a wide wavelength band. When the optical transmission line is seen section by section, however, there may exist a point where the absolute value of chromatic dispersion falls short of the predetermined value, thus leaving a possibility that transmission characteristics may locally deteriorate due to nonlinear optical phenomena such as four-wave mixing. Also, depending on the sequence of connection of respective optical fibers whose chromatic dispersion and dispersion slope are both positive and negative (the positional relationship of thus arranged two kinds of optical fibers observed in the traveling direction of propagating optical signals), accumulative chromatic dispersion may increase locally, thus yielding a possibility of transmission characteristics deteriorating due to an interaction between the accumulative chromatic dispersion and nonlinear optical phenomena.

In order to overcome problems such as those mentioned above, it is an object of the present invention to provide an optical transmission line comprising a structure which can yield favorable transmission characteristics over a wider wavelength band in use.

The optical transmission line according to the present invention comprises one or more first waveguides and one or more second waveguides having optical characteristics opposite to each other at a predetermined wavelength in a wavelength band in use, and also comprises a structure in which the first and second waveguides are alternately arranged along a traveling direction of optical signals in the wavelength band in use. Namely, the optical transmission line includes a section in which the first and second waveguides are arranged adjacent each other along the traveling direction of the optical signals in the wavelength band in use. In particular, each first waveguide has a chromatic dispersion with a sign opposite to that of the chromatic dispersion of each second waveguide and a dispersion slope with a sign opposite to that of the dispersion slope of each second waveguide.

The optical transmission line according to the present invention is disposed in at least one of places between an optical transmitter for emitting a plurality of wavelengths of optical signals and a receiver for receiving the optical signals, between the optical transmitter and a repeater station including an optical amplifier or the like, between repeater stations, and between the repeater station and the receiver. Also, the optical transmission line can be constituted by a unitary optical fiber having no junction, as well as a configuration in which a plurality of optical fibers functioning as each of the first waveguides and a plurality of optical fibers functioning as each of the second waveguides are fusion-spliced in a predetermined sequence. Along the traveling direction of optical signals, the unitary optical fiber as the optical transmission line is alternately formed with one or more first parts respectively corresponding to the f first waveguides and one or more second parts respectively corresponding to the second waveguides. Namely, in the unitary optical fiber, the first and second parts corresponding to the first and second waveguides, respectively, are formed so as to be adjacent each other along the traveling direction of optical signals in the wavelength band in use.

Since the optical transmission line according to the present invention is constituted by first and second waveguides (corresponding to the first and second parts in the unitary optical fiber, respectively) having respective chromatic dispersions with signs opposite to each other and respective dispersion slopes with signs opposite to each other at a predetermined wavelength (e.g., wavelength of 1.55 $\mu$m=1550 nm) in a wavelength band in use (e.g., 1.55[-] $\mu$m wavelength band), it can be designed not only so as to lower the absolute value of average chromatic dispersion observed as the whole optical transmission line, but also so as to lower the absolute value of average chromatic dispersion observed as the whole optical transmission line. As a consequence, transmission characteristics can effectively be restrained from deteriorating due to chromatic dispersion in WDM transmission utilizing a wider wavelength band. Also, the optical transmission line includes a section in which the first and second waveguides are arranged adjacent each other along the traveling direction of the optical signal in the wavelength band in use. Such a configuration prevents chromatic dispersion with a specific sign from occurring over a long haul, and also can effectively restrain transmission characteristics from deteriorating due to the interaction between accumulative chromatic dispersion and nonlinear optical phenomena.

In particular, in the basic configuration mentioned above, it is preferred that each of the first waveguides has a chromatic dispersion with an absolute value of 1 ps/nm/km or more but 10 ps/nm/km or less at the predetermined wavelength, and that each of the second waveguides has a chromatic dispersion with an absolute value of 1 ps/nm/km or more but 10 ps/nm/km or less at the predetermined wavelength (first characteristic feature). Here, the respective chromatic dispersions of the first and second waveguides have signs opposite to each other. If chromatic dispersion is generated to a certain extent over the whole optical transmission line, then the deterioration in transmission characteristics and fluctuation in transmission loss can be restrained from occurring due to nonlinear optical phenomena.

Preferably, in the above-mentioned basic configuration, both each first waveguide and each second waveguide have a length of 0.5 km or more but 10 km or less, whereas the product of the absolute value of chromatic dispersion at a predetermined wavelength in the wavelength band in use and the length in each of the first and second waveguides is 10 ps/nm or less (second characteristic feature). In this case, the accumulative chromatic dispersion does not become a high value, whereby transmission characteristics can further be restrained from deteriorating due to the interaction between accumulative chromatic dispersion and nonlinear optical phenomena. When combined with the above-mentioned first characteristic feature, the second characteristic feature can further suppress the deterioration of transmission characteristics in the optical transmission line.

Further, in the above-mentioned basic configuration, it is preferred that both each first waveguide and each second waveguide have an effective area of 40 $\mu$m$^2$ or more at the above-mentioned predetermined wavelength (third characteristic feature). Setting the effective are a larger to a certain extent can effectively suppress the occurrence of nonlinear optical phenomena. Here, as disclosed in Japanese Patent Application Laid-Open No. HEI 8-248251 (EP 0 724 171 A2), the above-mentioned effective area $A_{eff}$ is given by the following expression:

$$A_{eff} = 2\pi \left( \int_0^\infty E^2 r\, dr \right)^2 \Big/ \left( \int_0^\infty E^4 r\, dr \right)$$

where E is the electric field accompanying the propagating light, and r is the radial distance from the core center. The third characteristic feature can also be combined with at least one of the above-mentioned first and second characteristic features, and their combination can yield desirable effects.

In addition, it is preferred that the chromatic dispersion and dispersion slope in each of the first waveguides at the above-mentioned predetermined wavelength have an identical sign (e.g.,both are positive). Similarly, it is preferred that the chromatic dispersion and dispersion slope in each of the second waveguides at the above-mentioned predetermined wavelength have an identical sign (e.g., both are negative). If the chromatic dispersion and dispersion slope in one section (waveguide) are set so as to have the same sign, then the respective refractive index profiles of the first and second waveguides can have forms similar to each other, whereby the optical transmission line can be realized by a unitary optical fiber in which the first and second waveguides (corresponding to the first and second parts) are formed alternately. Also, the respective absolute values of average chromatic dispersion and average dispersion slope observed as the whole optical transmission line can easily be set to their predetermined values or lower.

Preferably, the average chromatic dispersion observed as the whole optical transmission line at the above-mentioned predetermined wavelength is designed so as to yield an absolute value of 3 ps/nm/km or less. This is because of the fact that it can effectively restrain transmission characteristics from deteriorating due to accumulative chromatic dispersion. Preferably, at the above-mentioned predetermined wavelength, the average dispersion slope observed as the whole optical transmission line is designed so as to yield an absolute value of 0.02 ps/nm$^2$/km or less. This is because of the fact that it can make transmission characteristics more uniform over the whole wavelength band in use at the time of WDM transmission. Preferably, at the predetermined wavelength, the average polarization mode dispersion observed as the whole optical transmission line is set to 0.2 ps·km$^{-\frac{1}{2}}$ or less. This is because of the fact that it can restrain transmission characteristics from deteriorating due to the polarization mode dispersion.

BRIEF DESCRIPTION OF THE DRAWINGS

FIGS. 1A to 1C are views for explaining a WDM transmission system including each embodiment of the optical transmission line according to the present invention, in which

DESCRIPTION OF THE PREFERRED EMBODIMENTS

In the following, embodiments of the optical transmission line according to the present invention will be explained in detail with reference to FIGS. 1A to 3B, 4, 5, 6A, and 6B. Here, constituents identical to each other among the drawings will be referred to with numerals or letters identical to each other without repeating their overlapping descriptions.

First Embodiment

Figure 1A:
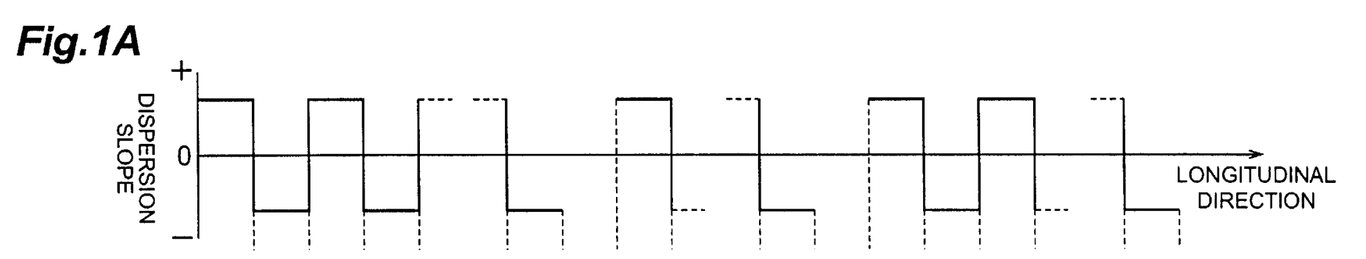
FIG. 1A is a chart showing the respective dispersion slopes in individual parts of the WDM transmission system along the longitudinal direction (coinciding with the propagating direction of optical signals)
Figure 1B:
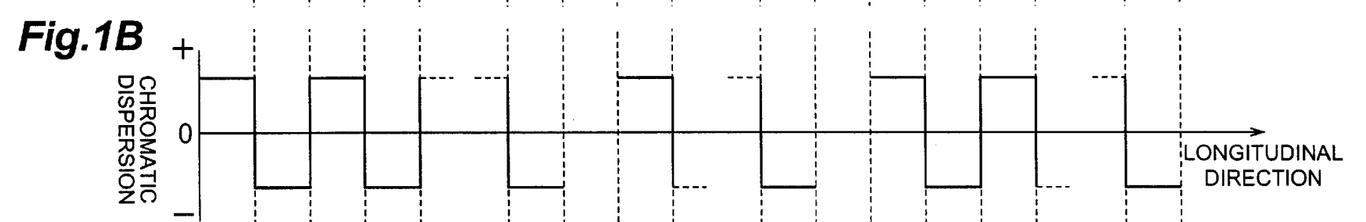
FIG. 1B is a chart showing the respective chromatic dispersions in individual parts of the WDM transmission system along the longitudinal direction.
Figure 1C:
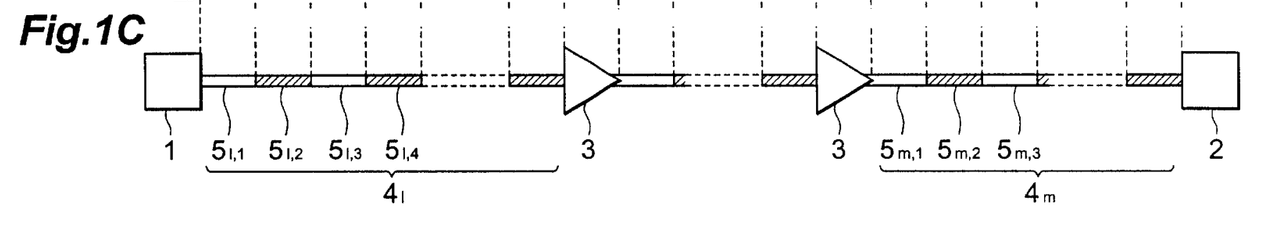
FIG. 1C is a diagram showing the configuration of the whole transmission system including a plurality of repeater stations.

To begin with, a first embodiment of the optical transmission line according to the present invention will be explained. FIGS. 1A to 1C are views showing the configuration of a WDM transmission system including the optical transmission line according to the first embodiment. In the WDM transmission system shown in FIG. 1C, one or more repeater stations 3 are installed between a transmitter 1 and a receiver 2, whereas the repeater stations 3 are optically coupled to one another by an optical fiber as the optical transmission line. Each repeater station 3 includes an optical amplifier for amplifying optical signals propagating through the optical fiber.

For example, in the WDM transmission system provided with (m−1) pieces of repeater stations 3, m pieces of repeater spans (optical transmission lines) $4_1$ to $4_m$ are interposed among the repeater stations 3. Depicted in the WDM transmission system shown in FIG. 1C are the first repeater span $4_1$ existing between the transmitter 1 and the first-stage repeater station 3 and the m-th repeater span $4_m$ existing between the final-stage repeater station 3 and the receiver 2.

Each repeater span $4_i$ is constituted by a plurality of waveguides (optical fibers) $5_{i,j}$ (i=1 to m; j=1, 2, 3, ..., n; m>1; n≧2) fusion-spliced to one another. In each repeater span $4_i$, waveguides $5_{i,j}$ whose suffix j is an odd number (j=1, 3, 5, ...) are first optical fibers having desirable transmission characteristics (including at least chromatic dispersion and dispersion slope) as shown in FIGS. 1A and 1B, whereas waveguides $5_{i,j}$ whose suffix j is an even number (j=2, 4, 6, ...) are second optical fibers having transmission characteristics opposite to those of the first optical fibers. Namely, in the optical transmission line according to the first embodiment, one or more first optical fibers. (waveguides whose suffix j is an odd number in FIG. 1C) and one or more second optical fibers (waveguides whose suffix is an even number in FIG. 1C) are disposed alternately along the longitudinal direction of the optical transmission line.

As a consequence, in the case where the repeater span $4_i$ is constituted by one first optical fiber and one second optical fiber, for example, one of the first and second optical fibers is disposed on the upstream side along the traveling direction of optical signals, whereas the other is disposed on the downstream side. In the case where the repeater span $4_i$ is constituted by one first optical fiber and two second optical fibers, the first and second optical fibers are arranged such that the first optical fiber is held between the second optical fibers. In the case where the repeater span $4_i$ is constituted by two first optical fibers and one second optical fiber, the first and second optical fibers are arranged such that the second optical fiber is held between the first optical fibers. In the case where the repeater span $4_i$ is constituted by a plurality of first optical fibers and a plurality of second optical fibers, the first and second optical fibers are arranged such that at least one selected from the first optical fibers is held between two selected from the second optical fibers, whereas at least one selected from the second optical fibers is held between two selected from the first optical fibers.

Specifically, at a predetermined wavelength (e.g., 1.55 μm=1550 nm) in a wavelength band in use (e.g., 1.55 -μm wavelength band), the first and second optical fibers have respective chromatic dispersions with signs opposite to each other and respective dispersion slopes with signs opposite to each other. Namely, it is preferred that, at the above-mentioned predetermined wavelength, when each of the first optical fibers has a positive chromatic dispersion and a positive dispersion slope, each of the second optical fibers has a negative chromatic dispersion and a negative dispersion slope as shown in FIGS. 1A and 1B.

In the optical transmission line, the first and second optical fibers having transmission characteristics opposite to each other as mentioned above are arranged alternately along the traveling direction of optical signals. Therefore, not only the absolute value of average chromatic dispersion observed as the whole optical transmission line can be made smaller, but also the absolute value of average dispersion slope can be made smaller. As a consequence, transmission characteristics are restrained from deteriorating due to chromatic dispersion over a wider wavelength band in use.

The optical transmission line is constituted by alternately arranged respective sections made of first and second optical fibers. Therefore, no chromatic dispersion with a specific sign would occur over a long haul, whereby the increase in accumulative dispersion is effectively suppressed, and transmission characteristics are restrained from deteriorating due to an interaction between the accumulative chromatic dispersion and nonlinear optical phenomena.

Preferably, each of the first and second optical fibers has achromatic dispersion with an absolute value of 1 ps/nm/km or more but 10 ps/nm/km or less. Also, each of the first and second optical fibers (waveguide sections) preferably has a fiber length (section length) of 0.5 km or more but 10 km or less. In addition, in each of the first and second optical fibers, the product of the absolute value of chromatic dispersion at the above-mentioned predetermined wavelength and the fiber length is preferably 10 ps/nm or less. If the optical transmission line is constituted by the first and second optical fibers designed as in the foregoing, chromatic dispersion locally occurs by a predetermined value or more, thereby effectively restraining transmission characteristics from deteriorating due to nonlinear optical phenomena. Also, the increase in accumulative dispersion is suppressed, whereby transmission characteristics are further restrained from deteriorating due to the interaction between accumulative chromatic dispersion and nonlinear optical phenomena.

Here, at the above-mentioned predetermined wavelength, each of the first optical fibers may have a positive chromatic dispersion and a negative dispersion slope, whereas each of the second optical fibers has a negative chromatic dispersion and a positive dispersion slope. However, it is preferred that chromatic dispersion and dispersion slope have signs identical to each other in each optical fiber. In the case where the signs of chromatic dispersion and dispersion slope coincide with each other, the respective refractive index profiles of the first and second optical fibers can be designed so as to have the same shape, whereby the absolute value of average chromatic dispersion and the absolute value of average dispersion slope, observed as the whole optical transmission line, can easily be designed so as to become their desirable values or lower.

In particular, at the above-mentioned predetermined wavelength, the average chromatic dispersion observed as the whole optical transmission line preferably has an absolute value of 3 ps/nm/km or less. This is because of the fact that it effectively restrains transmission characteristics from deteriorating due to accumulative chromatic dispersion. Also, at the above-mentioned predetermined wavelength, the average dispersion slope observed as the whole optical transmission line preferably has an absolute value of 0.02 ps/nm$^2$/km or less. This is because of the fact that it enables WDM transmission with more uniform transmission characteristics over the whole wavelength band in use (reduces fluctuations in transmission characteristics between wavelengths). At the above-mentioned predetermined wavelength, the average polarization mode dispersion observed as the whole optical transmission line is preferably 0.2 ps·km$^{-\frac{1}{2}}$ or less. This is because of the fact that it effectively restrains transmission characteristics from deteriorating due to the polarization mode dispersion. Further, each of the first and second optical fibers preferably has an effective area of 40 $\mu$m$^2$ or more at the above-mentioned wavelength. This is because of the fact that it restrains transmission characteristics from deteriorating due to nonlinear optical phenomena.

Optical fibers applicable to the optical transmission line according to the first embodiment will now be explained.

In the WDM transmission system assumed in the following explanation, each repeater span $4_i$ (i=1 to m) acting as the optical transmission line has a length of 50 km, the number of repeater spans m is 4, and the optical transmission distance from the transmitter 1 to the receiver 2 is 200 km. Also, each repeater span $4_i$ (i=1 to m) is constituted by 10 pieces of sections (each corresponding to any of the above-mentioned first and second optical fibers), each section having a section length (fiber length) of 5 km.

Figure 2A:
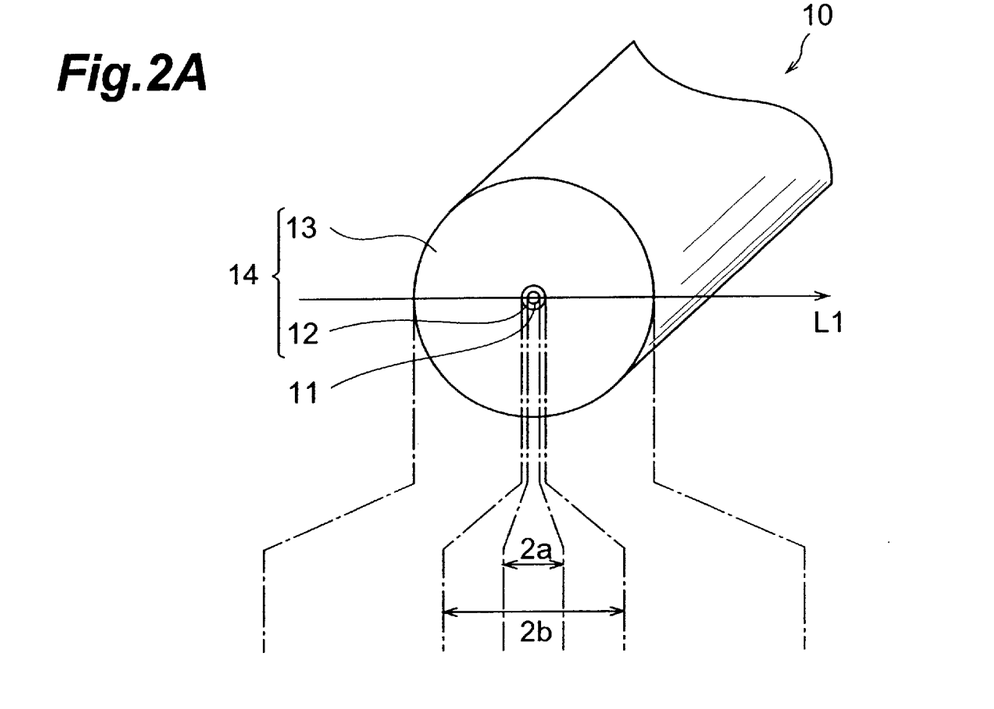
FIGS. 2A and 2B are views showing the cross-sectional structure and refractive index profile of an optical fiber applicable to a first embodiment of the optical transmission line according to the present invention.
Figure 2B:
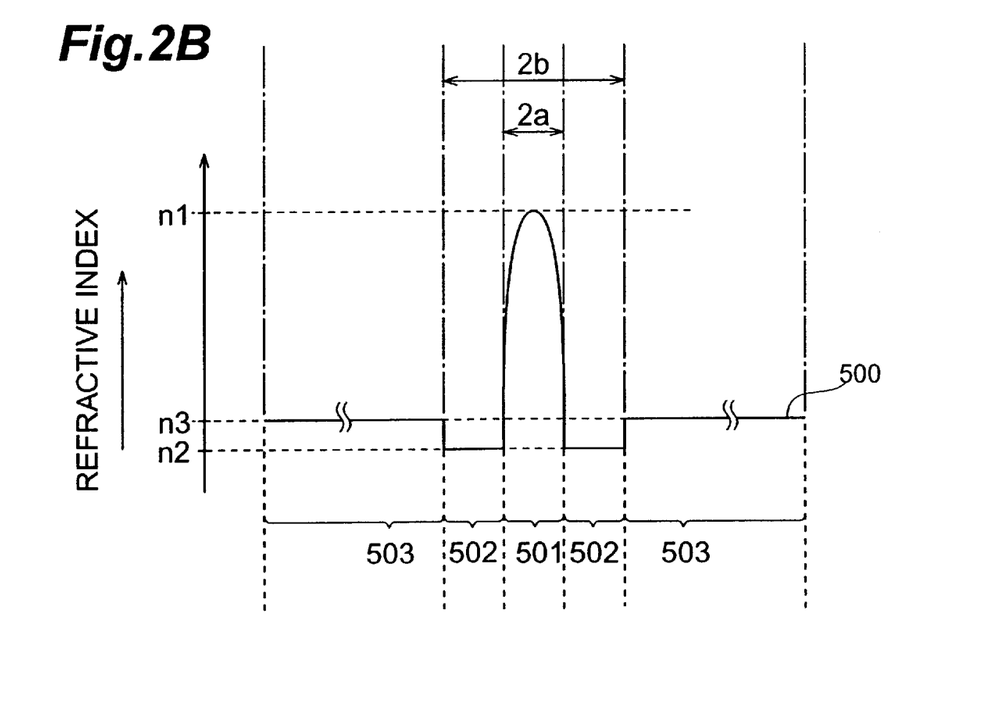

Each of the first and second optical fibers employed in the optical transmission line according to the first embodiment has a cross-sectional structure such as that shown in FIG. 2A, and a W-shaped refractive index profile 500 such as that shown in FIG. 2B.

Namely, an optical fiber 10 (including first and second optical fibers) comprises, as shown in FIG. 2A, a core 11 which is a region extending along a predetermined axis having a refractive index n1 and an outside diameter 2a, and a cladding region 14 provided on the outer periphery of the core 11. The cladding region 14 comprises an inner cladding 12, provided on the outer periphery of the core 11, having a refractive index n2 (<n1) lower than that of the core 11 and an outside diameter 2b; and an outer cladding 13, provided on the outer periphery of the inner cladding 12, having a refractive index n3 (>n2; <n1) higher than that of the inner cladding 12 but lower than that of the core 11.

Here, the refractive index profile 500 of FIG. 2B shows the refractive index at each location on a line L1 orthogonal to the center axis of the optical fiber 10 shown in FIG. 2A. In the refractive index profile 500, areas 501, 502, and 503 show refractive indices on the line L1 at locations in the core 11, inner cladding 12, and outer cladding 13, respectively.

The optical fiber 10 can be constituted by, for example, silica glass doped with $GeO_2$ as the core 11, silica glass doped with F element as the inner cladding 12, and non-intentionally doped silica glass (hereinafter referred to as pure silica glass) as the outer cladding 13. Also, the chromatic dispersion and dispersion slope of the optical fiber 10 can be changed by adjusting the outside diameter 2a of the core 11 and the outside diameter 2b of the inner cladding 12, whereby the above-mentioned first and second optical fibers are obtained.

Thus designed first optical fibers exhibited, at a wavelength of 1.55 $\mu$m, a chromatic dispersion of +1.5 ps/nm/km to +5.2 ps/nm/km and a positive dispersion slope. On the other hand, the second optical fibers exhibited, at a wavelength of 1.55 $\mu$m, a chromatic dispersion of −4.7 ps/nm/km to −1.2 ps/nm/km and a negative dispersion slope. In the optical transmission line according to the first embodiment in which the first and second optical fibers having such optical characteristics were alternately arranged, the average chromatic dispersion and average dispersion slope at a wavelength of 1.55 $\mu$m, observed as the whole optical transmission line, were 0.1 ps/nm/km and 0.013 ps/nm$^2$/km, respectively, which were both sufficiently small values. Also, at a wavelength of 1.55 $\mu$m, the average polarization mode dispersion observed as the whole optical transmission line was 0.07 ps·km$^{-\frac{1}{2}}$, which was a sufficiently small value.

Subsequently, the inventors studied the optical transmission line according to the first embodiment in which single-mode optical fibers each having a step index type refractive index profile were employed as the first optical fibers, whereas dispersion-compensating optical fibers each having a similar step index type refractive index profile were employed as the second optical fibers.

Each of the employed first optical fibers (single-mode optical fibers) exhibited, at a wavelength of 1.55 $\mu$m, a chromatic dispersion of +17 ps/nm/km and a dispersion slope of +0.057 ps/nm$^2$/km. On the other hand, each of the employed second optical fibers (dispersion-compensating optical fibers) exhibited, at a wavelength of 1.55 $\mu$m, a chromatic dispersion of −51 ps/nm/km and a dispersion slope of −0.18 ps/nm$^2$/km. The inventors constructed an optical transmission line having a total length of 80 km from a plurality of transmission units each comprising a pair of first and second optical fibers. In each transmission unit, the ratio of the fiber length (section length) of the first optical fibers (corresponding to the sections $5_{i,j}$ in FIG. 1C, where j=1, 3, 5, . . . ) to the fiber length of their adjacent second optical fibers (corresponding to the sections $5_{i,j+1}$ in FIG. 1C) was set to 3:1, whereas the unit length of each transmission unit, which was the sum of the fiber lengths of first and second optical fibers, was set to 4 to 16 km.

In the optical transmission line in which the first and second optical fibers were alternately arranged as such, the average chromatic dispersion and average dispersion slope, observed as the whole optical transmission line at a wavelength of 1.55 µm, were −1 ps/nm/km and 0.006 ps/nm²/km, respectively, which were both sufficiently small values. Also, at a wavelength of 1.55 µm, the average polarization mode dispersion observed as the whole optical transmission line was 0.05 ps·km$^{-\frac{1}{2}}$, which was a sufficiently small value.

Second Embodiment

A second embodiment of the optical transmission line according to the present invention will now be explained. The configuration of the optical communications system including the optical transmission line according to the second embodiment is substantially the same as that shown in FIGS. 1A to 1C. However, the optical transmission line according to the second embodiment differs from the optical transmission line according to the first embodiment in that each of the repeater spans $4_1$ to $4_m$ is constituted by a unitary optical fiber.

Each repeater span $4_i$ is a unitary optical fiber including a plurality of sections $5_{i,j}$ (i=1 to m; j=1, 2, 3, . . . , n; m>1; n ≧2). In each repeater span $4_i$ (unitary optical fiber), sections $5_{i,j}$ whose suffix j is an odd number (j=1, 3, 5, . . . ) are first parts having desirable transmission characteristics (including at least chromatic dispersion and dispersion slope), whereas sections $5_{i,j}$ whose suffix j is an even number (j=2, 4, 6, . . . ) are second parts having transmission characteristics opposite to those of the first parts. Namely, the optical transmission line according to the second embodiment is a unitary optical fiber in which the above-mentioned first optical parts (sections whose suffix j is an odd number) and the above-mentioned second optical fibers (sections whose suffix is an even number) are disposed alternately along the traveling direction of optical signals.

As a consequence, in the case where the unitary optical fiber acting as the repeater span $4_i$ includes one first part and one second part, for example, one of the first and second parts is formed on the upstream side along the traveling direction of optical signals, whereas the other is formed on the downstream side. In the case where the unitary optical fiber acting as the repeater span $4_i$ includes one first part and two second parts, the first and second optical parts are formed such that the first optical part is held between the second optical fibers. In the case where the unitary optical fiber acting as the repeater span $4_i$ includes two first parts and one second part, the first and second parts are formed such that the second part is held between the first parts. In the case where the unitary optical fiber acting as the repeater span $4_i$ includes a plurality of first parts and a plurality of second parts, the first and second parts are formed such that at least one selected from the first parts is held between two selected from the second parts, whereas at least one selected from the second parts is held between two selected from the first parts.

At a predetermined wavelength (e.g., 1.55 µm=1550 nm) in a wavelength band in use (e.g., 1.55 µm wavelength band), the first and second parts each partly constituting the above-mentioned unitary optical fiber have respective chromatic dispersions with signs opposite to each other and respective dispersion slopes with signs opposite to each other. Namely, at the above-mentioned predetermined wavelength, each of the first parts has a positive chromatic dispersion and a positive dispersion slope, whereas each of the second parts has a negative chromatic dispersion and a negative dispersion slope (see FIGS. 1A and 1B).

Thus, the optical transmission line according to the second embodiment includes a unitary optical fiber comprising first and second parts having respective chromatic dispersions with signs opposite to each other and dispersion slopes with signs opposite to each other. Therefore, not only the absolute value of average chromatic dispersion observed as the whole optical transmission line can be made smaller, but also the absolute value of average dispersion slope observed as the whole optical transmission line can be made smaller in this configuration as well. It enables WDM transmission in which transmission characteristics are effectively restrained from deteriorating due to chromatic dispersion over a wider wavelength band in use.

Since the first and second parts are alternately formed along the traveling direction of optical signals in the optical transmission line according to the second embodiment, no chromatic dispersion with a specific sign would occur over a long haul, whereby the increase in accumulative dispersion is effectively suppressed, and transmission characteristics are restrained from deteriorating due to an interaction between the accumulative chromatic dispersion and nonlinear optical phenomena.

Preferably, each of the first and second parts has a chromatic dispersion with an absolute value of 1 ps/nm/km or more but 10 ps/nm/km or less. Also, each of the first and second parts preferably has a length of 0.5 km or more but 10 km or less. In addition, in each of the first and second parts, the product of the absolute value of chromatic dispersion at the above-mentioned predetermined wavelength and the length is preferably 10 ps/nm or less. If the optical transmission line is constituted by the unitary optical fiber including a plurality of parts designed as in the foregoing, chromatic dispersion locally occurs by a predetermined value or more, thereby effectively restraining transmission characteristics from deteriorating due to nonlinear optical phenomena. Also, the increase in accumulative dispersion is suppressed, whereby transmission characteristics are further restrained from deteriorating due to the interaction between accumulative chromatic dispersion and nonlinear optical phenomena.

Here, at the above-mentioned predetermined wavelength, each of the first parts may have a positive chromatic dispersion and a negative dispersion slope, whereas each of the second parts has a negative chromatic dispersion and a positive dispersion slope. Where each of the above-mentioned parts is concerned, however, it is preferred that chromatic dispersion and dispersion slope have signs identical to each other. In the case where the signs of chromatic dispersion and dispersion slope coincide with each other, the respective refractive index profiles of the first and second parts can be designed so as to have the same shape, whereby it becomes easier to make the unitary optical fiber including these parts. In addition, the absolute value of average chromatic dispersion and the absolute value of average dispersion slope, observed as the whole optical transmission line, can easily be designed so as to become their predetermined values or lower.

In particular, at the above-mentioned predetermined wavelength, the average chromatic dispersion observed as the whole optical transmission line preferably has an absolute value of 3 ps/nm/km or less. This is because of the fact that it effectively restrains transmission characteristics from deteriorating due to accumulative chromatic dispersion. Also, at the above-mentioned predetermined wavelength, the average dispersion slope observed as the whole optical transmission line preferably has an absolute value of 0.02 ps/nm$^2$/km or less. This is because of the fact that it enables WDM transmission with more uniform transmission characteristics over the whole wavelength band in use (reduces fluctuations in transmission characteristics between wavelengths). At the above-mentioned predetermined wavelength, the average polarization mode dispersion observed as the whole optical transmission line is preferably 0.2 ps·km$^{-\frac{1}{2}}$ or less. This is because of the fact that it effectively restrains transmission characteristics from deteriorating due to the polarization mode dispersion. Further, each of the first and second optical fibers preferably has an effective area of 40 $\mu$m$^2$ or more at the above-mentioned wavelength. This is because of the fact that it restrains transmission characteristics from deteriorating due to non-linear optical phenomena.

Optical fibers applicable to the optical transmission line according to the second embodiment will now be explained.

Figure 3A:
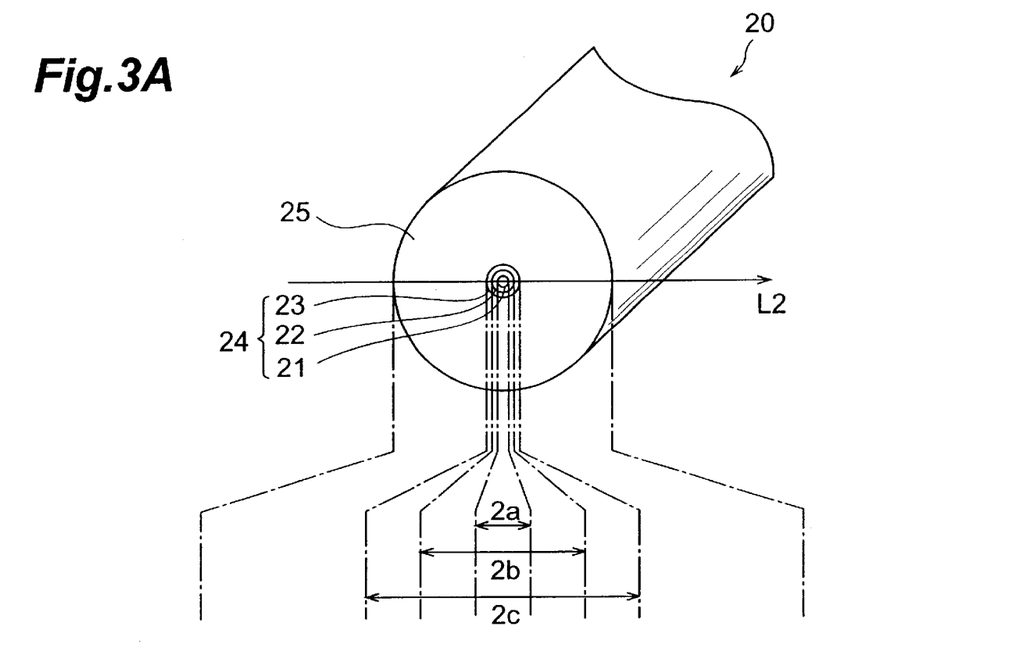
FIGS. 3A and 3B are views showing the cross-sectional structure and refractive index profile of an optical fiber applicable to a second embodiment of the optical transmission line according to the present invention.
Figure 3B:
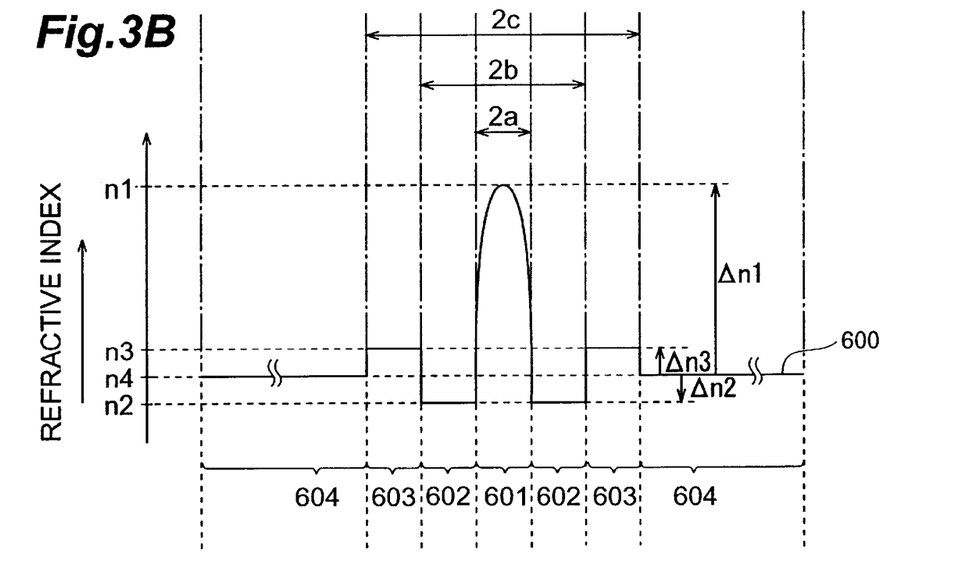

FIG. 3A shows the cross-sectional structure of the unitary optical fiber (optical transmission line according to the second embodiment) corresponding to each of the repeater spans $4_i$ (i=1 to m) in FIG. 1C, whereas FIG. 3B shows its refractive index profile. As shown in FIG. 3A, this unitary optical fiber 20 comprises a core region 24 extending along a predetermined axis, and a cladding 25 provided on the outer periphery of the core region 24. The core region 24 comprises a first core 21 having a refractive index n1 and an outside diameter 2a; a second core 22, provided on the outer periphery of the first core 21, having a refractive index n2 (<n1) lower than that of the first core 21 and an outside diameter 2b; and a third core 23, disposed at the outer periphery of the second core 22, having a refractive index n3 (<n1; >n2) lower than that of the first core 21 but higher than that of the second core 22 and an outside diameter 2c. The cladding 25 is provided on the outer periphery of the third core 23 and has a refractive index n4 (<n3) lower than that of the third core 23.

Here, the refractive index profile 600 of FIG. 3B shows the refractive index at each location on a line L2 orthogonal to the center axis of the unitary optical fiber 20 shown in FIG. 3A. In the refractive index profile 600, areas 601, 602, 603, and 604 show refractive indices on the line L2 at locations in the first core 21, second core 22, third core 23, and cladding 25, respectively. Respective relative refractive index differences $\Delta$n1, $\Delta$n2, and $\Delta$n3 of the first to third cores 21 to 23 with respect to the cladding region 25 as the reference region are given as follows:

$\Delta n1=(n1-n4)/n4$ $\Delta n2=(n2-n4)/n4$ $\Delta n3=(n3-n4)/n4$

In this specification, the relative refractive index differences $\Delta$ are expressed in terms of percentage, whereas the refractive indices in each expression is arranged in the same order. Therefore, each of regions having a refractive index lower than that of the cladding region acting as reference region has a negative relative refractive index difference.

The unitary optical fiber 20 can be constituted by, for example, silica glass doped with GeO$_2$ as the first core 21, silica glass doped with F element as the second core 22, pure silica glass (non-intentionally doped silica glass) as the third core 23, and silica glass doped with F element as the cladding 25.

Upon applying the above-mentioned unitary optical fiber 20 to the optical transmission line according to the second embodiment, the inventors studied its transmission characteristics under the following conditions.

Namely, in each of prepared samples of the unitary optical fiber 20, the outside diameters 2a, 2b, and 2c of the first, second, and third cores 21, 22, 23 were set to 8.1 $\mu$m, 15.8 $\mu$m, and 22.6 $\mu$m, respectively. On the other hand, the relative refractive index differences $\Delta$n1 and $\Delta$n2 of the first and second cores 21, 22 with reference to the refractive index n4 of the cladding 25 were set to 0.63% and −0.25%, respectively.

In each of the prepared samples, the drawing tension at the time of drawing an optical fiber from an optical fiber preform was adjusted, so as to form the above-mentioned first and second sections alternately. Namely, in each sample, the relative refractive index difference $\Delta$n3 of the third core 23 made of pure silica glass where the drawing tension was concentrated so as to apply residual stress thereto was adjusted to 0.13% to 0.22%, whereby the first and second parts were formed, whereas desirable chromatic dispersion and dispersion slope were adjusted for each of these parts.

Figure 4:
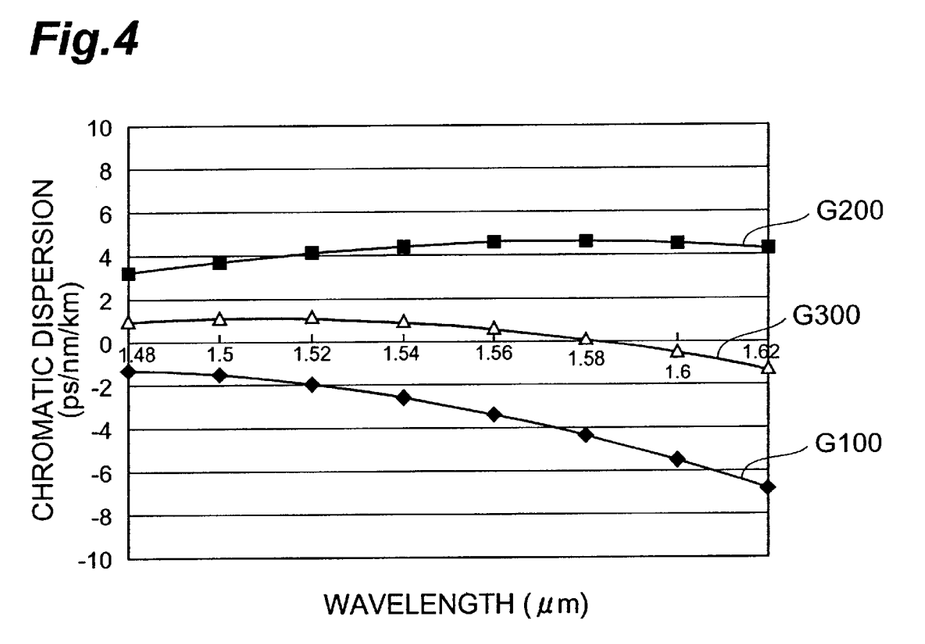
FIG. 4 is a graph showing, as to the optical transmission line (unitary optical fiber) according to the second embodiment, the respective chromatic dispersions of samples manufactured at drawing tensions of 40 g and 90 g, and their average value.

In each of the prepared samples, the length of each part was set to 8 km. Namely, each sample was made while the drawing tension was changed every time the drawing length became 8 km. The drawing tension had two standards of 40 g and 90 g. FIG. 4 is a graph showing the respective chromatic dispersions of samples made at drawing tensions of 40 g and 90 g, and their average value. In FIG. 4, curve G100 indicates the chromatic dispersion of the sections (second parts) obtained upon drawing at a drawing tension of 40 g, curve G300 indicates the chromatic dispersion of the sections (first parts) obtained upon drawing at a drawing tension of 90 g, and curve G200 indicates their average value. The first parts (sections drawn at a drawing tension of 90 g) exhibited, at a wavelength of 1.55 $\mu$m, a chromatic dispersion of +4.4 ps/nm/km to +4.7 ps/nm/km, a dispersion slope of +0.006 ps/nm$^2$/km to +0.008 ps/nm$^2$/km, and an effective area of 40.2 $\mu$m$^2$ to 41.7 $\mu$m$^2$. The second parts (sections drawn at a drawing tension of 40 g) exhibited, at a wavelength of 1.55 $\mu$m, a chromatic dispersion of −2.4 ps/nm/km to −3.3 ps/nm/km, a dispersion slope of −0.046 ps/nm$^2$/km to −0.042 ps/nm$^2$/km, and an effective area of 42.1 $\mu$m$^2$ to 43.9 $\mu$m$^2$.

In addition, the optical transmission line employing each sample (a unitary optical fiber) in which first and second parts having transmission characteristics such as those mentioned above were alternately formed exhibited, at a wavelength of 1.55 $\mu$m, an average chromatic dispersion of 0.8 ps/nm/km observed as the whole optical transmission line and an average dispersion slope of −0.015 ps/nm$^2$/km observed as the whole optical transmission line, which were both sufficiently small values. Also, at a wavelength of 1.55 $\mu$m, the average polarization mode dispersion observed as the whole optical transmission line was 0.09 ps·km$^{-\frac{1}{2}}$, which was also a sufficiently small value.

Figure 5:
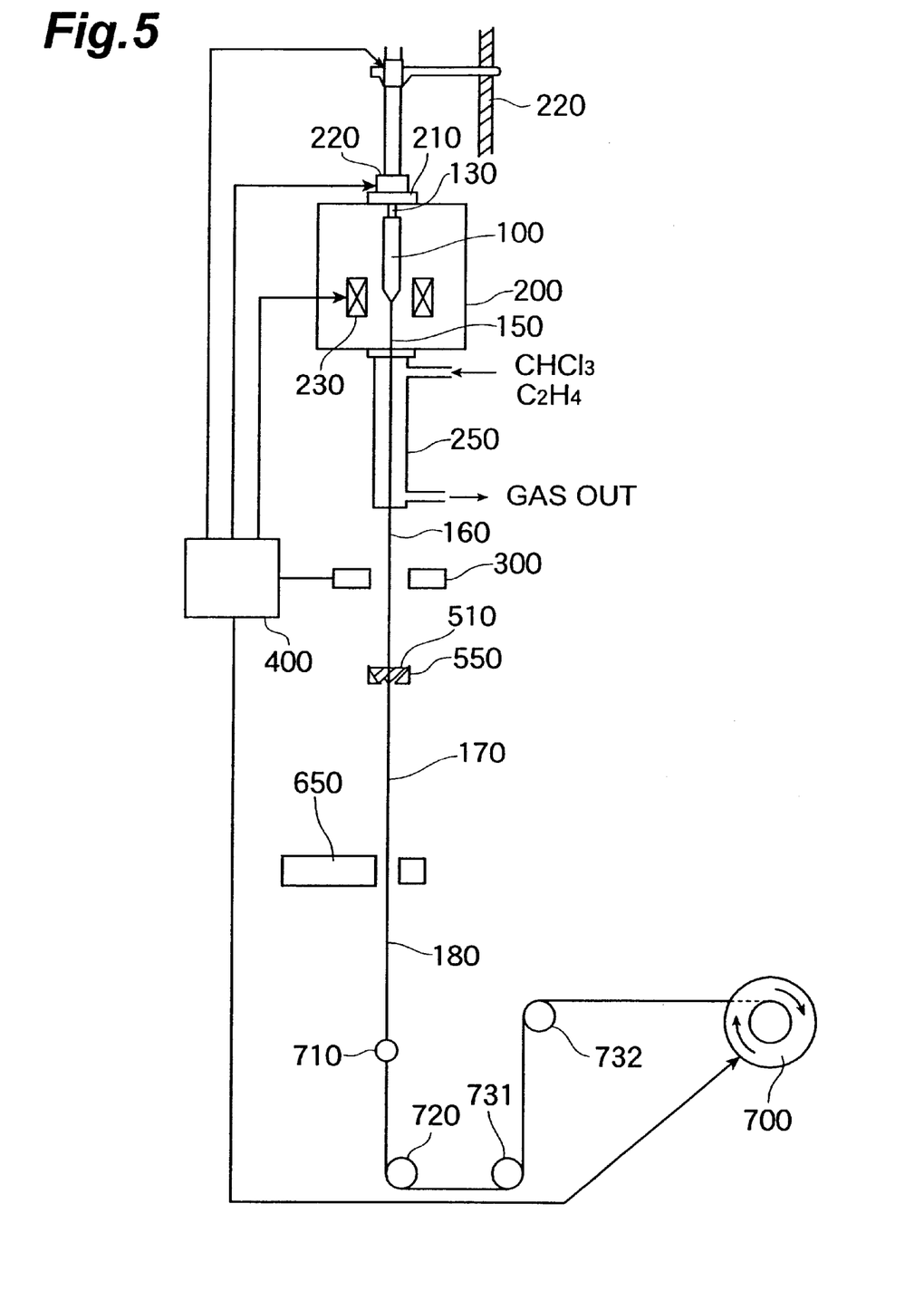
FIG. 5 is a view showing the structure of an apparatus for making an optical fiber as the optical transmission line according to the first and second embodiments.

FIG. 5 is a view showing the structure of a manufacturing apparatus for explaining the unitary optical fiber according to the second embodiment as mentioned in the foregoing.

As shown in FIG. 5, an optical fiber preform 100 to be drawn is initially prepared in the making of the unitary optical fiber such as that mentioned above. The optical fiber preform 100 is mainly composed of silica glass, and can be prepared by vapor-phase axial deposition method (VAD method), outside vapor deposition method (OVD method), inside vapor phase oxidation method (MCVD method), rod-in-tube method, or the like.

Next, the optical fiber preform 100 is attached to a dummy rod 130, and a preform leader 220 moves the dummy rod 130 toward a heater 230, whereby the optical fiber preform 100 attached to the dummy rod 130 is introduced into the heater 230. As the lower end of the optical fiber preform 100 heated by the heater 230 is drawn, a bare fiber 150 is obtained.

The bare fiber 150 obtained by drawing subsequently passes through a reaction tube 250 for forming a carbon coat. A mixed gas of carbon halide ($CHCl_3$, $CCl_4$, or the like) and hydrocarbon ($C_2H_4$, $C_3H_8$, $C_6H_6$, or the like) is supplied into the reaction tube 250. As the carbon halide and hydrocarbon in the mixed gas react with each other on the surface of bare fiber 150, the surface is covered with a hermetic coat (carbon coat) 151 mainly composed of carbon.

The outside diameter of the carbon-coated fiber 160 covered with the carbon coat 151 is measured by a laser outside diameter meter 300. A control system 400 controls the heating temperature and drawing rate according to the result of measurement obtained by the laser outside diameter meter 300, such that the outside diameter of the carbon-coated fiber 160 becomes a predetermined value (usually 125 μm).

The carbon-coated fiber 160 having passed through the laser outside diameter meter 300 further passes through a liquid resin 510 stored in a resin coating die 550, whereby the resin adheres to the surface of carbon-coated fiber 160 (thus generating a resin-attached fiber 170). Subsequently, the resin-attached fiber 170 passes a UV lamp 650. At this time, the resin attached to the surface of carbon-coated fiber 160 cures due to UV irradiation from the UV lamp 650. As a consequence, an optical fiber 180 in which the surface of the carbon-coated fiber 160 is covered with a resin film 161 is obtained, and thus obtained optical fiber 180 is taken up by a drum 700.

In the foregoing drawing step, the drawing tension is changed at least every time when the length of bare fiber 150 attains a predetermined value, whereby a unitary optical fiber in which first and second parts are alternately formed is obtained.

Figure 6A:
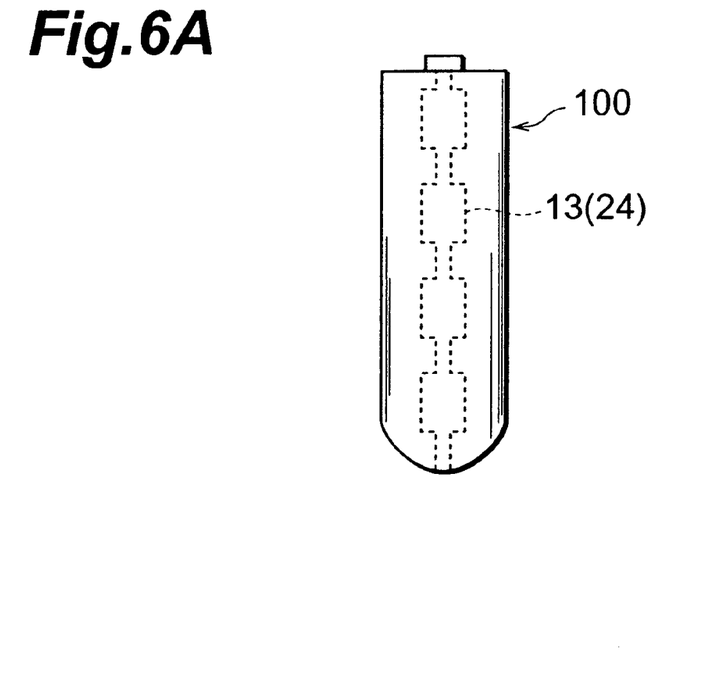
FIGS. 6A and 6B are views showing examples of structures of an optical fiber preform for yielding a unitary optical fiber as the optical transmission line according to the second embodiment.
Figure 6B:
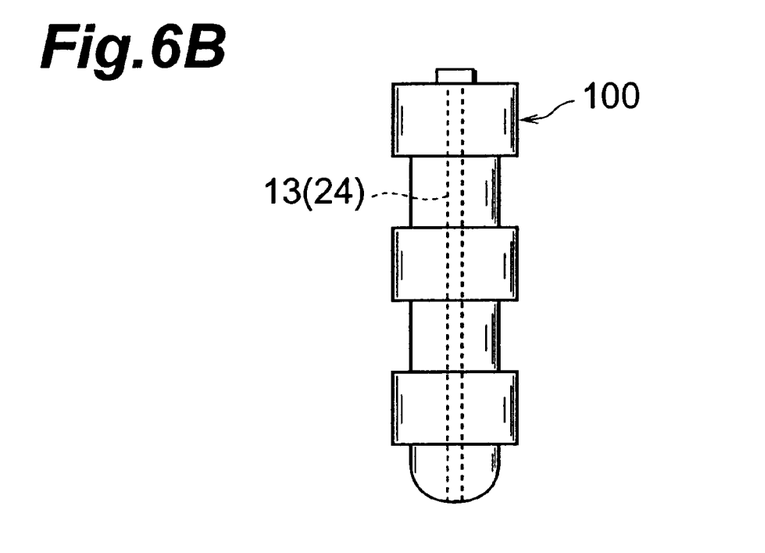

Here, a unitary optical fiber in which first and second parts having optical characteristics reversed to each other are alternately formed is obtained when the drawing tension at the time of drawing is periodically changed as mentioned above. Even when the drawing tension at the time of drawing is set constant, however, a unitary optical fiber in which first and second parts having desirable transmission characteristics are alternately formed is obtained if the optical fiber preform 100 prepared beforehand is processed as shown in FIGS. 6A and 6B, for example. Here, the optical fiber preform 100 shown in FIG. 6A has a structure in which, while the outside diameter of the preform is held constant, the outside diameter of the part to form the core region 13 (24) is periodically changed along the longitudinal direction thereof. The optical fiber preform 100 shown in FIG. 6B, on the other hand, has a structure in which, while the outside diameter of the part to form the core region 13 (24) is held constant, the outside diameter of the preform is periodically changed along the longitudinal direction thereof. The unitary optical fiber as the optical transmission line according to the second embodiment is also obtained if the optical fiber preforms 100 shown in FIGS. 6A and 6B are drawn.

As in the foregoing, the optical transmission line according to the present invention is constructed by alternately connecting respective waveguides having opposite signs of chromatic dispersion and dispersion slope at a predetermined wavelength in a wavelength band in use, or a unitary optical fiber in which respective parts corresponding to the waveguides are alternately formed, whereas these waveguides or parts having transmission characteristics with signs opposite to each other each have a chromatic dispersion of 1 ps/nm/km or more but 10 ps/nm/km or less at the predetermined wavelength. This configuration can lower not only the absolute value of average chromatic dispersion observed as the whole optical transmission line, but also the average dispersion slope observed as the whole transmission line. Also, it enables WDM transmission which can effectively restrain transmission characteristics from deteriorating due to chromatic dispersion in a wide wavelength band in use.

Further, since the optical transmission line according to the present invention comprises alternately arranged waveguides having transmission characteristics with signs opposite to each other at a predetermined wavelength in a wavelength band in use or a unitary optical fiber in which the respective parts corresponding the waveguides are alternately formed, no chromatic dispersion with a specific sign occurs over a long haul (the increase in accumulative chromatic dispersion is suppressed), and transmission characteristics are effectively restrained from deteriorating due to an interaction between accumulative chromatic dispersion and nonlinear optical phenomena.

What is claimed is:

1. An optical transmission line comprising:
    one or more first waveguides each having, at a predetermined wavelength in a wavelength band in use, a chromatic dispersion with an absolute value of 1 ps/nm/km or more but 10 ps/nm/km or less, and a dispersion slope with a predetermined sign, each of said first waveguides having a zero dispersion wavelength which does not exist in the range of 1500–1600 nm; and
    one or more second waveguides each having, at the predetermined wavelength in said wavelength band in use, a chromatic dispersion, in a sign opposite to that of the chromatic dispersion of each said first waveguide, with an absolute value of 1 ps/nm/km or more but 10 ps/nm/km or less and a dispersion slope in a sign opposite to that of the dispersion slope of each said first waveguide, each of said second waveguides having a zero dispersion wavelength which does not exist in the range of 1500–1600 nm;
    said optical transmission line including a section in which said first and second waveguides are arranged adjacent each other along a traveling direction of optical signals in said wavelength band in use.

2. An optical transmission line according to claim 1, wherein said optical transmission line is a unitary optical fiber, said unitary optical fiber being provided with first parts respectively corresponding to said first waveguides and second parts respectively corresponding to said second waveguides, said first and second parts being arranged adjacent each other along a longitudinal direction of said unitary optical fiber.

3. An optical transmission line according to claim 1, wherein each said first waveguide has a length of 0.5 km or more but 10 km or less, and wherein each said second waveguide has a length of 0.5 km or more but 10 km or less.

4. An optical transmission line according to claim 1, wherein the product of the absolute value of chromatic dispersion at the predetermined wavelength in said wavelength band in use in each said first waveguide and the length thereof is 10 ps/nm or less, and wherein the product of the absolute value of chromatic dispersion at the predetermined wavelength in said wavelength band in use in each said second waveguide and the length thereof is 10 ps/nm or less.

5. An optical transmission line according to claim 1, wherein each said first waveguide has a positive chromatic dispersion and a positive dispersion slope at the predetermined wavelength in said wavelength band in use, and wherein each said second waveguide has a negative chromatic dispersion and a negative dispersion slope at the predetermined wavelength in said wavelength band in use.

6. An optical transmission line according to claim 1, wherein said optical transmission line as a whole has an average chromatic dispersion with an absolute value of 3 ps/nm/km or less at the predetermined wavelength in said wavelength band in use.

7. An optical transmission line according to claim 1, wherein said optical transmission line as a whole has an average dispersion slope with an absolute value of 0.02 ps/nm²/km or less at the predetermined wavelength in said wavelength band in use.

8. An optical transmission line according to claim 1, wherein said optical transmission line as a whole has an average polarization mode dispersion of 0.2 ps·km$^{-\frac{1}{2}}$ or less at the predetermined wavelength in said wavelength band in use.

9. An optical transmission line according to claim 1, wherein each said first waveguide has an effective area of 40 $\mu$m² or more, and wherein each said second waveguide has an effective area of 40 $\mu$m² or more.

10. An optical transmission line including a unitary optical fiber;
    said unitary optical fiber including a section comprising:
        one or more first parts each having, at a predetermined wavelength in a wavelength band in use, a chromatic dispersion with an absolute value of 1 ps/nm/km or more but 10 ps/nm/km or less, and a dispersion slope with a predetermined sign; and
        one or more second parts each having, at the predetermined wavelength in said wavelength band in use, a chromatic dispersion, in a sign opposite to that of the chromatic dispersion of each said first part, with an absolute value of 1 ps/nm/km or more but 10 ps/nm/km or less, and a dispersion slope with a sign opposite to that of the dispersion slope of each said first part;
        said first and second parts being arranged adjacent each other along a traveling direction of optical signals in said wavelength band in use in said section of said unitary optical fiber.

11. An optical transmission line according to claim 10, wherein each said first part has a length of 0.5 km or more but 10 km or less, and wherein each said second part has a length of 0.5 km or more but 10 km or less.

12. An optical transmission line according to claim 10, wherein the product of the absolute value of chromatic dispersion at the predetermined wavelength in said wavelength band in use in each said first part and the length thereof is 10 ps/nm or less, and wherein the product of the absolute value of chromatic dispersion at the predetermined wavelength in said wavelength band in use in each said second part and the length thereof is 10 ps/nm or less.

13. An optical transmission line according to claim 10, wherein each said first part has a positive chromatic dispersion and a positive dispersion slope at the predetermined wavelength in said wavelength band in use, and wherein each said second part has a negative chromatic dispersion and a negative dispersion slope at the predetermined wavelength in said wavelength band in use.

14. An optical transmission line according to claim 10, wherein said optical transmission line as a whole has an average chromatic dispersion with an absolute value of 3 ps/nm/km or less at the predetermined wavelength in said wavelength band in use.

15. An optical transmission line according to claim 10, wherein said optical transmission line as a whole has an average dispersion slope with an absolute value of 0.02 ps/nm²/km or less at the predetermined wavelength in said wavelength band in use.

16. An optical transmission line according to claim 10, wherein said optical transmission line as a whole has an average polarization mode dispersion of 0.2 ps·km$^{-\frac{1}{2}}$ or less at the predetermined wavelength in said wavelength band in use.

17. An optical transmission line according to claim 10, wherein each said first part has an effective area of 40 $\mu$m² or more, and wherein each said second part has an effective area of 40 $\mu$m² or more.

18. An optical transmission line comprising:
    one or more first waveguides in which the product of the absolute value of chromatic dispersion of each said first waveguide at a predetermined wavelength in a wavelength band in use and the length thereof is 10 ps/nm or less;
    one or more second waveguides each having, at the predetermined wavelength in said wavelength band in use, a dispersion slope with a sign opposite to that of the dispersion slope of each said first waveguide, the product of the absolute value of chromatic dispersion of each said second waveguide at the predetermined wavelength in said wavelength band in use and the length thereof being 10 ps/nm or less;
    said optical transmission line including a section in which said first and second waveguides are arranged adjacent each other along a traveling direction of optical signals in said wavelength band in use.

19. An optical transmission line according to claim 18, wherein said optical transmission line is a unitary optical fiber, said unitary optical fiber being provided with first parts respectively corresponding to said first waveguides and second parts respectively corresponding to said second waveguides, said first and second parts being arranged adjacent each other along a longitudinal direction of said unitary optical fiber.

20. An optical transmission line according to claim 18, wherein each said first waveguide has a length of 0.5 km or more but 10 km or less, and wherein each said second waveguide has a length of 0.5 km or more but 10 km or less.

21. An optical transmission line according to claim 18, wherein each said first waveguide has a positive chromatic dispersion and a positive dispersion slope at the predetermined wavelength in said wavelength band in use, and wherein each said second waveguide has a negative chromatic dispersion and a negative dispersion slope at the predetermined wavelength in said wavelength band in use.

22. An optical transmission line according to claim 18, wherein said optical transmission line as a whole has an average chromatic dispersion with an absolute value of 3 ps/nm/km or less at the predetermined wavelength in said wavelength band in use.

23. An optical transmission line according to claim 18, wherein said optical transmission line as a whole has an average dispersion slope with an absolute value of 0.02 ps/nm²/km or less at the predetermined wavelength in said wavelength band in use.

24. An optical transmission line according to claim 18, wherein said optical transmission line as a whole has an average polarization mode dispersion of 0.2 ps·km$^{-1/2}$ or less at the predetermined wavelength in said wavelength band in use.

25. An optical transmission line according to claim 18, wherein each said first waveguide has an effective area of 40 μm² or more, and wherein each said second waveguide has an effective area of 40 μm² or more.

26. An optical transmission line comprising:
   a plurality of first waveguides each having an effective area of 40 μm² or more at a predetermined wavelength in a wavelength band in use; and
   a plurality of second waveguides each having, at the predetermined wavelength in said wavelength band in use, a chromatic dispersion in a sign opposite to that of the chromatic dispersion of each said first waveguide, a dispersion slope in a sign opposite to that of the dispersion slope of each said first waveguide, and an effective area of 40 μm² or more;
   said optical transmission line including a section in which at least one selected from said first waveguides is arranged so as to be held between two selected from said second waveguides, and at least one selected from said second waveguides is arranged so as to be held between two selected from said first waveguides.

27. An optical transmission line according to claim 26, wherein each said first waveguide has a chromatic dispersion with an absolute value of 1 ps/nm/km or more but 10 ps/nm/km or less at the predetermined wavelength in said wavelength band in use; and wherein each said second waveguide has a chromatic dispersion, in a sign opposite to that of the chromatic dispersion of each said first waveguide, with an absolute value of 1 ps/nm/km or more but 10 ps/nm/km or less at the predetermined wavelength in said wavelength band in use.

28. An optical transmission line according to claim 26; wherein said optical transmission line is a unitary optical fiber, said unitary optical fiber being provided with first parts respectively corresponding to said first waveguides and second parts respectively corresponding to said second waveguides, said first and second parts being arranged adjacent each other along a longitudinal direction of said unitary optical fiber.

29. An optical transmission line according to claim 26, wherein each said first waveguide has a length of 0.5 km or more but 10 km or less, and wherein each said second waveguide has a length of 0.5 km or more but 10 km or less.

30. An optical transmission line according to claim 27, wherein the product of the absolute value of chromatic dispersion at the predetermined wavelength in said wavelength band in use in each said first waveguide and the length thereof is 10 ps/nm or less, and wherein the product of the absolute value of chromatic dispersion at the predetermined wavelength in said wavelength band in use in each said second waveguide and the length thereof is 10 ps/nm or less.

31. An optical transmission line according to claim 26, wherein each said first waveguide has a positive chromatic dispersion and a positive dispersion slope at the predetermined wavelength in said wavelength band in use, and wherein each said second waveguide has a negative chromatic dispersion and a negative dispersion slope at the predetermined wavelength in said wavelength band in use.

32. An optical transmission line according to claim 26, wherein said optical transmission line as a whole has an average chromatic dispersion with an absolute value of 3 ps/nm/km or less at the predetermined wavelength in said wavelength band in use.

33. An optical transmission line according to claim 26, wherein said optical transmission line as a whole has an average dispersion slope with an absolute value of 0.02 ps/nm²/km or less at the predetermined wavelength in said wavelength band in use.

34. An optical transmission line according to claim 26, wherein said optical transmission line as a whole has an average polarization mode dispersion of 0.2 ps·km$^{-1/2}$ or less at the predetermined wavelength in said wavelength band in use.

35. An optical transmission line comprising:
   one or more first waveguides each having, at a predetermined wavelength in a wavelength band in use, a chromatic dispersion with an absolute value of 1 ps/nm/km or more but 10 ps/nm/km or less, and a dispersion slope with a predetermined sign; and
   one or more second waveguides each having, at the predetermined wavelength in said wavelength band in use, a chromatic dispersion, in a sign opposite to that of the chromatic dispersion of each said first waveguide, with an absolute value of 1 ps/nm/km or more but 10 ps/nm/km or less and a dispersion slope in a sign opposite to that of the dispersion slope of each said first waveguide;
   said optical transmission line including a section in which said first and second waveguides are arranged adjacent each other along a traveling direction of optical signals in said wavelength band in use,
   wherein each said first waveguide has a positive chromatic dispersion and a positive dispersion slope at the predetermined wavelength in said wavelength band in use, and wherein each said second waveguide has a negative chromatic dispersion and a negative dispersion slope at the predetermined wavelength in said wavelength band in use.

36. An optical transmission line including a unitary optical fiber;
   said unitary optical fiber including a section comprising:
   one or more first parts each having, at a predetermined wavelength in a wavelength band in use, a chromatic dispersion with an absolute value of 1 ps/nm/km or more but 10 ps/nm/km or less, and a dispersion slope with a predetermined sign; and
   one or more second parts each having, at the predetermined wavelength in said wavelength band in use, a chromatic dispersion, in a sign opposite to that of the chromatic dispersion of each said first part, with an absolute value of 1 ps/nm/km or more but 10 ps/nm/km or less, and a dispersion slope with a sign opposite to that of the dispersion slope of each said first part;
   said first and second parts being arranged adjacent each other along a traveling direction of optical signals in said wavelength band in use in said section of said unitary optical fiber,
   wherein each of said first part has a positive chromatic dispersion and a positive dispersion slope at the predetermined wavelength in said wavelength band in use, and wherein each said second part has a negative chromatic dispersion and a negative dispersion slope at the predetermined wavelength in said wavelength band in use.

* * * * *